(12) United States Patent
Dong et al.

(10) Patent No.: US 7,565,019 B2
(45) Date of Patent: Jul. 21, 2009

(54) METHOD OF VOLUME-PANORAMA IMAGING PROCESSING

(75) Inventors: Jian Dong, Nanshan (CN); Dong Ni, Nanshan (CN); Bin Yao, Nanshan (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 665 days.

(21) Appl. No.: 11/316,440

(22) Filed: Dec. 22, 2005

(65) Prior Publication Data
US 2006/0239571 A1 Oct. 26, 2006

(30) Foreign Application Priority Data
Mar. 29, 2005 (CN) .................. 2005 1 0033907

(51) Int. Cl.
*G06K 9/36* (2006.01)
(52) U.S. Cl. ............... 382/236; 382/103; 382/105; 382/299; 382/173; 382/284; 348/36; 345/32; 375/240.01; 375/240.12; 375/240.16
(58) Field of Classification Search .......... 348/473, 348/474, 699, 700; 600/443, 447, 454–456, 600/458; 382/236, 239, 173, 128, 260, 190, 382/243, 255, 268; 375/240.21
See application file for complete search history.

(56) References Cited

U.S. PATENT DOCUMENTS

| | | | |
|---|---|---|---|
| 5,566,674 A | | 10/1996 | Weng |
| 5,588,067 A | * | 12/1996 | Peterson et al. ............ 382/103 |
| 5,689,611 A | * | 11/1997 | Ohta et al. .................. 386/46 |
| 5,782,766 A | * | 7/1998 | Weng et al. ................. 600/443 |
| 6,328,693 B1 | * | 12/2001 | Miyatake et al. ............ 600/437 |
| 6,605,042 B2 | * | 8/2003 | Dong et al. ................. 600/447 |

(Continued)

FOREIGN PATENT DOCUMENTS

JP 8-280688 10/1996

*Primary Examiner*—Vikkram Bali
*Assistant Examiner*—Nancy Bitar
(74) *Attorney, Agent, or Firm*—Kory D. Christensen; Stoel Rives LLP

(57) ABSTRACT

The present invention discloses a method of volume-panorama imaging processing, which generates a volume-panorama image by subsequently splicing respective image frames from an image sequence obtained in a real-time way or stored in a medium based upon the fact that the immediately adjacent image frames have the largest correlation. The method comprises the steps of: reading the image sequence, and firstly initializing an aligned image and a spliced image; dividing the i-th image frame $F_i$ into a plurality of sub-regions; calculating a motion vector of the i-t image frame with respect to the aligned image; fitting the motion vector to calculate a transform coefficient; splicing the $F_i$ to the current spliced image based upon the transform coefficient, and updating the aligned image; entering into a self-adaptive selection of a next image frame until the end of the splicing; and outputting the current spliced image as a resultant image. Additionally, when the image $F_i$ is spliced, double-filtering architecture of selecting characteristic points through a filtering and selecting the valid motion vector of the selected characteristic points through the other filtering to reduce an alignment error may be adopted. According to the present invention, the volume-panorama imaging can be done quickly and accurately so that the reliability of images particularly meets a very high requirement of the ultrasonic iatric diagnose.

28 Claims, 3 Drawing Sheets

U.S. PATENT DOCUMENTS 7,308,028 B2 * 12/2007 Suh .................. 375/240.12
2006/0034374 A1 * 2/2006 Park et al. ............ 375/240.16
2006/0034529 A1 * 2/2006 Park et al. ................ 382/236
2006/0239571 A1 * 10/2006 Dong et al. ................ 382/236
2008/0252717 A1 * 10/2008 Moon et al. ................ 348/36

* cited by examiner

METHOD OF VOLUME-PANORAMA IMAGING PROCESSING

FIELD OF THE INVENTION

The present invention relates to image data processing or generation, and particularly to a method of data processing or generation, which splices a plurality of two-dimensional images into a single image.

BACKGROUND OF THE INVENTION

"Volume-Panorama-Imaging" refers to such a technique that splices a series of two-dimensional images into one continuous image, which are obtained through moving a probe within the same plane. Due to a relatively large quantity of processed data, this technique generally utilizes a high-speed processor or computer to reconstruct the single image, and becomes increasingly widely used in the field of data pick-up in which a relatively large object is sensed with a minor probe, such as the acquisition of a fingerprint with a tiny probe. Particularly in the field of medical ultrasonic imaging, there is a higher requirement and a wide demand for the technique for the purpose of the aided iatric diagnosis.

Taking an ultrasonic instrument for example, due to the harmless, convenient and reliable characteristics of ultrasonic, the ultrasonic perspective has become a common and auxiliary approach for the doctor to observe a part within a human body structure and diagnose its illness, and the doctor can obtain ultrasonic images of the corresponding part within the body by manipulating a probe disposed on the skin surface of the human body. However, the scanned area of a general probe is limited, resulting in a restriction on the size of the single ultrasonic image that the doctor can see. When the single ultrasonic image fails to display the panorama of the part, the doctor has to move the probe back and forth so as to observe different regions of the part. Thus, when a region to be detected is located beyond an image, it is impossible to utilize the general measurement function of ultrasonic to directly measure the size of the region. Up to the present, in order to solve the above limitation on the depth of field for the probe, a preferable approach is to splice a series of images obtained through a back-and-forth scan of the same plane by the doctor into one "elongated" ultrasonic image based upon the correlation between the images by means of the technique of volume-panorama imaging, which facilitates the measurement of a relatively large region.

The concept of image splicing in the above volume-panorama imaging has been proposed very early. During the development of the ultrasonic instrument from M-ultrasonic to B-ultrasonic of a single scan line, a series of scan lines is spliced so as to compose a two-dimensional image, and then the concept of the compound B-Scanner is proposed. That is, a B-ultrasonic probe is fixed on a mechanical arm which limits the movement of the probe within the same plane, current positional information of the probe is recoded in a real-time way, and the information is used to splice a series of images obtained during the movement of the probe into one image. The method with the compound B-Scanner is very inconvenient due to its use of the mechanical arm. Moreover, since the mechanical arm is not practical for the modern handhold ultrasonic probe, its development ends in the field of the image splicing. In the latest decade, various techniques of volume-panorama imaging have been continuously proposed with respect to the image splicing of the handhold ultrasonic probe. Generally speaking, the volume-panorama imaging includes two portions of alignment and splicing. The alignment includes the steps of calculating a relative offset (offx,offy) and a relative rotation angle $\theta$ between images and combining the relative offset (offx,offy) and relative rotation angle $\theta$ into one transform coefficient (offx,offy,$\theta$) that can simply determine a geometry transform between two images. The splicing refers to a procedure of combining the two images into one image through the transform coefficient. The procedure of the splicing is seldom described in many patents because the alignment is generally considered as the critical step for achieving a correct volume-panorama image.

SAD (Sum of Absolute Difference) is used as one of methods for calculating the offset. According to the method of SAD, firstly, one image is generally divided into a plurality of parts, and for each of the parts, a region corresponding to that part is selected in another image; secondly, a SAD value is calculated based upon respective positional data of the two corresponding parts and the position of the region with the smallest SAD value is the best matching position for that part. In this way, the offset is obtained through a calculation of the relative relation between the positions of the two corresponding parts. The method of SAD is also used in some techniques to calculate the rotation angle. Similar to the calculation of the offset, the image is rotated within a range of angles based upon a preset step interval; a similarity with respect to another image is calculated for each rotation with the method of SAD; and the rotation position with the smallest SAD value is a desired rotation angle.

In addition to the method of SAD, the method of MLS (Moving Least Square) can also be used to calculate the offset or the rotation angle. For example, the method of MLS is utilized in both patents of U.S. Pat. No. 5,566,674 owned by Siemens Corp. and of U.S. Pat. No. 6,605,042 B2 owned by GE Corp.

Hereinafter, an introduction will be made on the patent of U.S. Pat. No. 5,566,674 for Siemens Corp.

The method of the patent comprises the steps of:

a) dividing the n-th frame Fn into a plurality of regions;

b) calculating a local motion vector with the method of SAD;

c) correcting the local motion vector through a fuzzy logic to obtain a final local motion vector;

d) calculating a global motion vector and a rotation angle with the method of MLS, i.e. calculating a transform coefficient;

e) splicing the Fn to a volume-panorama image in which previous n−1 frames are spliced together so as to generate a new spliced image;

f) sharpening the image; and g) n=n+1 and returning to the step of a) if the n-th frame exists, otherwise outputting the spliced image as a resultant image.

Specifically, the n-th image frame is divided into a plurality of small image regions, wherein the i-th sub-region is referred as n(i); a region to be searched is determined on a current spliced image; the n(i) is moved within the searched region; SAD value is calculated based upon data of each point within a corresponding position during the movement; and the position of the MSAD (Minimum SAD, i.e. the smallest SAD value) is judged as the best match for the n(i), and the offset between that position and the original position of the region n(i) is the local offset vector of the region. The regional SAD is calculated as follows:

$$SAD_{m,n} = \sum_{i=1}^{l}\sum_{j=1}^{k}|X_{i,j} - Y_{i+m,j+n}|$$

Where, l and k define the size of the region n(i), X and Y represent the grayscale values of a point within the region n(i) and of a corresponding point within the searched region respectively, and m and n are the abscissa and the ordinate of an arbitrary point within the searched region. Thus, the point (m, n) corresponding which the $SAD_{m,n}$ is the smallest is the best match for the corresponding n-th region n(i) within the searched region on the current spliced image, thereby determining the local offset vector v(i) of the region n(i).

In order to ensure the correctness of the local offset vector, the fuzzy logic is used in the step of c) to correct the vector. Specifically, two parameters are input to the fuzzy logic so as to evaluate the correctness of the current local offset vector and output a weighted value; and a weighted average is performed on the local offset value and a historical offset vector based upon the weighted value. Where, the first parameter is a difference between the MASD and the averaged SAD for judging the reliability of the MSAD, and the second parameter is a deviation of the current offset vector v(i) from a previous offset vector h(i). The final local offset is obtained through the correction for each initial local offset. Such a step of correcting the vector is absent in the patent of U.S. Pat. No. 6,605,042 B2 owned by GE Corp.

The type of a function for the mathematic model F(x) used in practice is often related to the physical background for the experiment and the actual distribution of data, typically including some parameters to be determined. The method of MLS is an important tool to estimate parameters depending upon experimental data, which estimates an optimum value for the parameters in the F(x) based on a set of discrete data obtained experimentally, and the optimum value allows a minimum of the total error between the model and the data obtained actually. The method of MLS has been used in both of the above patents, in virtue of which the global offset and rotation angle are calculated with the local offset.

During the splicing stage (the step of e), the weighted average is used to calculate grayscale values of an overlapped part according to U.S. Pat. No. 5,566,674. The weighted calculation is as follows:

$SC(n)=((1-m)\cdot(SC(n-1))+(m\cdot Input(n))$

Where, SC(n−1) is a volume-panorama image in which previous n−1 frames are spliced together, and Input(n) is the n-th image frame. The weight m depends on the serial number of the image and the scan speed.

Due to the presence of the repeated weighting procedure during the splicing, the image need to be sharpened once after the splicing, that is, the spliced image need to be filtered in a high-pass way.

The drawbacks of the above prior art will be described mainly from the following aspects:

a) With regard to the aspect of calculating the rotation angle between the images with the method of SAD: this method requires a range of rotation and a step interval for each rotation angle to be determined in advance, but the step interval for the angle is difficult to determine, in that the quantity of the calculation will increase and the speed will be slowed down if the interval is too small, and the accuracy of the calculation will be lowered if the interval is too large, for an accurate rotation angle may be between two calculation angles.

b) With regard to the aspect of performing alignment with the spliced image: theoretically, the two immediately adjacent images are the most correlated. Since grayscale values of pixels on the spliced image are generally subject to a certain processing, the accuracy of the alignment result with the spliced image and the n-th image frame may be inferior to that of the alignment result with previous (n−1)-th image frame and the n-th image frame.

c) With regard to the aspect of performing alignment and splicing using each image frame among the series of images sequentially: taking the series of four image frames $F_1$, $F_2$, $F_3$, $F_4$ for example, the function $D(F_i,F_j)$ represents an offset between two image frames, i.e. $F_i$ and $F_j$, in X direction, which is obtained through a calculation with the MLS. It is assumed that $D(F_1,F_2)$=1.6, $D(F_2,F_3)$=3.8, $D(F_3,F_4)$=2.5, $D(F_1,F_4)$=8.5, and for the convenience of the description, it is assumed that an offset of an integer number is used for the splicing. In this case, due to a rounding, there will be an error of 1.1 pixels (i.e. 0.4+0.2+0.5) for a $D(F_1, F_4)$ obtained through the calculation for every two frames. However, there is only an error of 0.5 pixel in the case of a direct splicing with the $F_1$ and the $F_4$. Consequently, such sequential processing is not advantageous for reducing the error. On the other hand, such sequential processing will lower the processing speed.

d) With regard to the aspect of calculating the offset with the SAD directly based upon data of each point within the regions divided from an image: in a case where the image has a large block of area in which the change of gradient is unobvious, this method will lower the accuracy of the calculation.

e) With regard to the aspect of calculating the transform coefficient with the based upon the local offset obtained with the SAD, particularly for the patent of U.S. Pat. No. 6,605,042 B2 for GE. Corp.: the experiments has proved that it is not the case that the offsets calculated from all the regions are correct due to noises of the ultrasonic images and organic movements, and consequently the transform coefficient may not be correct and result in a serious abnormity on the spliced image.

SUMMARY OF THE INVENTION

The present invention has been conceived to solve the aforementioned problems in the prior art and to provide a method of volume-panorama imaging processing, capable of reconstructing a volume-panorama image quickly through splicing a series of partial images, obtaining a spliced volume-panorama image with a relatively high accuracy, and in particular meeting the very high requirement of the iatric ultrasonic apparatus for the diagnose of illness.

To solve the above technical problems, the basic concepts of the present invention are as follows: the elements for processing the volume-panorama imaging are a series of images arranged subsequently in term of time; the data correlation is generally the largest between data of the immediately adjacent image frames, i.e. there exists a relatively large overlapped region; during the procedure of splicing and extending a selected single image frame subsequently and continuously into the volume-panorama image based upon the first image frame, a aligned image and a spliced image can be established respectively for calculating a transform coefficient at the time of aligning the image $F_i$ and splicing the image $F_i$ to generate an output image; and the processing system self-adaptively adjusts the interval for picking up the image sequence based upon the current status (such as the cases of being too fast, too slow, an invalid alignment or the like), so as to ensure a quick execution of the processing and to improve the speed of the system and the reliability of the imaging. Furthermore, at the time of splicing the images, the processing system is also directed to the characteristic of changes of the image data, so that the characteristic points can be selected through a filtering with a threshold, and the alignment error can be reduced through filtering the motion vectors of the characteristic points with an index parameter, while improving the speed and the accuracy of the calculation results.

According to the first aspect of the present invention, there is provided a method of volume-panorama imaging processing, for generating an object image from an image sequence obtained in a real-time way or stored in a medium, in which the serial number i of an image is 1, 2, 3, . . . , and $\Delta$ is an interval for the picking up image sequence, comprising the steps of:

a. obtaining the image sequence, and initializing an aligned image and a spliced image as a first image frame, where i=2 and $\Delta$=1;

b. dividing the i-th image frame $F_i$ into a plurality of sub-regions;

c. calculating a motion vector of the i-th image frame with respect to the aligned image;

d. calculating a transform coefficient based upon a fitting of the motion vector;

e. splicing the $F_i$ to the current spliced image based upon the transform coefficient, and configuring or splicing the aligned image with the $F_i$; and f. i=i+$\Delta$, and returning to the step of b if the i-th frame exists, otherwise outputting the current spliced image as a resultant image.

In the above method, after the step of c, the method further comprises a step of:

g. judging whether the translation amount of the $F_i$ is within a controllable range based upon the motion vector, and entering into the step of d if yes, otherwise recovering i by i=i–$\Delta$, adjusting $\Delta$ within the value range of $\Delta$, performing i=i+$\Delta$ and entering into the step of b.

In the above method, the step of c involves performing the steps of:

c1. selecting a plurality of characteristic points on the image $F_i$;

c2. searching the current alignment image for a corresponding point of each characteristic point; and c3. calculating the motion vector of each point pair constituted by the characteristic point and the corresponding point.

In the above method, the step of c2 involves performing the steps of:

1) determining a template (30) on the image $F_i$ for the characteristic point, which is a region that includes a set of adjacent points centering on the characteristic point;

2) determining a searched region (29') on the current alignment image; and 3) determining a corresponding point of the characteristic point within the searched region through a similarity calculation, which is a central point of an adjacent region (30') with a same size as the template and with the largest similarity.

In the above method, in the step of e: the single image frame $F_i$ is spliced to the current spliced image with the method of a weighted average of the partially overlapped region; and for the splicing of the aligned image, the single image frame $F_i$ is directly embedded in the current aligned image based upon the transform coefficient.

According to the second aspect of the present invention, there is provided a method of volume-panorama imaging processing, for generating an object image from an image sequence obtained in a real-time way or stored in a medium, in which the serial number i of an image is 1, 2, 3, . . . , comprising the steps of:

a. obtaining an image sequence, and initializing a spliced image as a first image frame, where, i=2;

b. search the i-th image frame $F_i$ for a characteristic point;

c. calculating a valid motion vector of the i-th image frame, and jumping to step of F if the number of the motion vectors is not enough;

d. calculating a transform coefficient based upon a fitting of the motion vectors;

e. splicing the $F_i$ to the current spliced image based upon the transform coefficient; and f. i=i+1, and returning to the step of b if the i-th frame exists, otherwise outputting the current spliced image as a resultant image.

In the above method, the step of b involves performing the steps of:

b1. performing divisions for a middle part of the image $F_i$;

b2. selecting valid sub-regions from the sub-regions of the image $F_i$ through a filtering; and b3. selecting a characteristic point in each valid sub-region.

With the above methods, the object images can be generated quickly and accurately from the series of images obtained in a real-time way or stored in the medium, and the reliability of the generated volume-panorama object images can particularly meet a very high requirement of the ultrasonic apparatus for the iatric diagnose.

DETAILED DESCRIPTION OF THE INVENTION

Hereinafter, the invention will be further described in conjunction with the preferred embodiments illustrated in the accompanying drawings.

Figure 1:
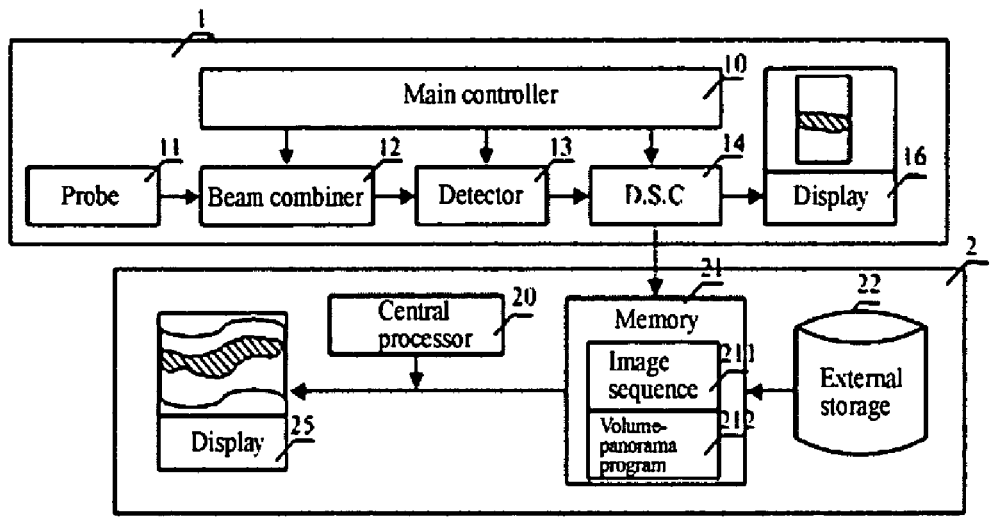
FIG. 1 is a block diagram showing the hardware construction of the volume-panorama imaging system according to an embodiment of the invention.

FIG. 1 is a block diagram showing the hardware construction of the volume-panorama imaging system according to an embodiment of the invention. The system comprises an ultrasonic imaging apparatus 1 and a workstation apparatus 2. A probe 11 transmits an ultrasonic wave to a detected organism and receives an ultrasonic echo reflected from the detected organism. The echo signal enters into a beam combiner 12. Then, the signal is outputted from a detector 13 after a focus delay, a weighting and a channel sum. The detector 13 outputs the signal to a D.S.C digital signal transformer 14 in order to complete a coordinate transform. Finally, the transformed signal is outputted to a display 16 to display a single image frame. A main controller 14 in the ultrasonic imaging apparatus 1 performs all the controls on the above procedures. A professional practitioner moves the probe 11 on the skin surface of the detected organism continuously and smoothly to obtain a series of single image frames. These image frames are displayed on the display 16 in a real-time way or alternatively stored in a memory 21 of the workstation apparatus 2 via an acquisition card. The content stored in the memory 21 includes data of an image sequence 211 and also a program for a volume-panorama processing 212. Under the control of a CPU 20, the system executes the program 212 to combine the image sequence 211 into one volume-panorama image and send it to a display 25 of the workstation for displaying. Additionally, the system may transfer the image sequence stored in an external storage 22 into the memory 21 for the volume-panorama imaging.

Figure 2:
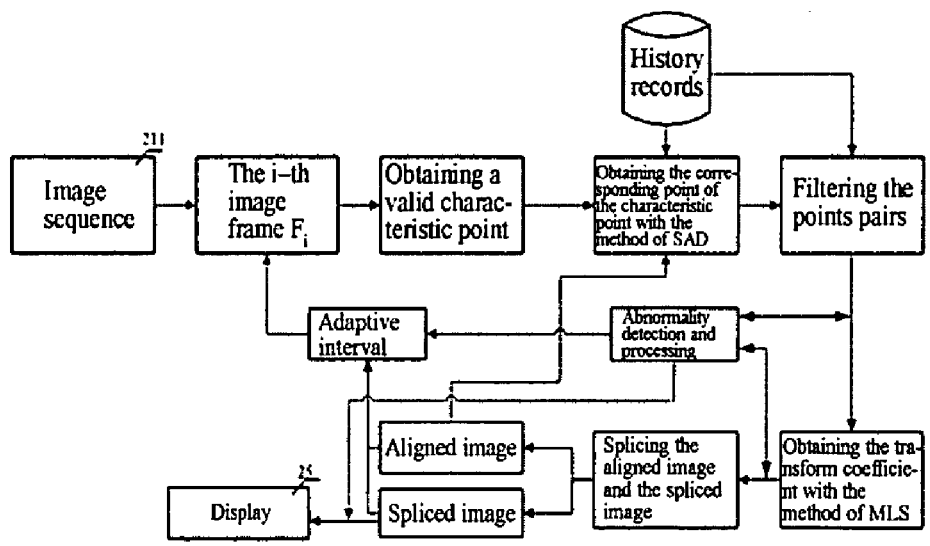
FIG. 2 is a schematic diagram showing the procedure of the volume-panorama imaging method according to the embodiment of the invention.

Taking the above hardware-based volume-panorama imaging system for example, FIG. 2 shows the general flow of generating the volume-panorama image from the image sequence 211 by the system. Hereinafter, the method according the embodiment of the invention will be described in connection with the flow.

The serial number i of the image is 1, 2, 3. . . , and $\Delta$ is an interval for picking up the image sequence. The method according to the first embodiment of the invention comprises the steps of:

a. obtaining the image sequence, and initializing an aligned image and a spliced image as a first image frame, where i=2 and $\Delta=1$;

b. dividing the i-th image frame $F_i$ into a plurality of sub-regions;

c. calculating a motion vector of the i-th image frame with respect to the aligned image;

d. calculating a transform coefficient based upon a fitting of the motion vector;

e. splicing the $F_i$ to the current spliced image based upon the transform coefficient, and configuring or splicing the aligned image with the $F_i$; and f. i=i+$\Delta$, and returning to the step of b if the i-th frame exists, otherwise outputting the current spliced image as a resultant image.

The above steps relate to two main procedures of alignment and splicing. The former is used to obtain the transform coefficient, and the latter is used to splice the spliced image or the aligned image. In the step of e, the spliced image is obtained through a weighted average of the single image frame $F_i$ and the current spliced image, while the aligned image may be one comparison image frame which is configured directly with the $F_i$, or may be a spliced and extended image which is obtained through directly embedding the $F_i$ in the current aligned image based upon the transform coefficient, wherein the latter case can be applied more widely. Thus, when a motion vector of a subsequent image frame is generated with the method of SAD, sufficient use of the correlation between the data of a previous image frame and of a subsequent image frame can be ensured, and accordingly a spliced image capable of sufficiently considering the data transition can be generated. These specific procedures will be described in details below.

Since the interval between two adjacent image frames in the image sequence is short in practice, the correlation of data is very high. If a transform coefficient is calculated for all the images one by one, a systematic error will be easily accumulated due to a small transform coefficient, while the processing speed of the system will be slow. Therefore, in view of improving of the speed and the accuracy, adjusting the interval $\Delta$ self-adaptively may be employed so as to extract the spliced image. The adjusting shall depend on various factors, such as the actual width of an image frame, the pixels number of each line, the scan speed, the acquisition speed or the like. For instance, for a case of an image with a specific width: if the width of a single image frame is 35.4 mm, the pixels number of each line is 233, the acquisition speed is 19 f/s, and the scan speed is 10 mm/s, then the interval of data between two adjacent image frames is defined as: the pixels number/ the width of the single image frame * the scan speed/the acquisition speed=3.46 pixels. If the transform coefficient is calculated for each image frame, then 3.46 will be rounded 100 times for 101 image frames. If the interval $\Delta$ for picking up the image sequence is changed to 2, then 6.92 will be rounded only 50 times. Obviously, the error will be greatly reduced and the processing speed will also be significantly increased.

Therefore, according to the ultrasonic apparatus of the present embodiment, a scheme of an self-adaptive interval is adopted and the design is as follows: 1) the interval will be shortened if a calculated translation speed is very fast and beyond a threshold; 2) the interval will be largened if the calculated translation speed is very slow and beyond the threshold; and 3) the interval for the images will be controlled so as to keep the translation amount within a preferred range if the calculated translation speed is within the normal range. Generally, the interval $\Delta$ for the images is set in a range from 1 to 15. Thus, the following step is further comprised after the step of c:

g. judging whether the translation amount of the $F_i$ is within a controllable range based upon the motion vector, and entering into the step of d if yes, otherwise recovering i by i=i−$\Delta$, adjusting $\Delta$ within the value range of $\Delta$, performing i=i+$\Delta$ and entering into the step of b.

Where, the controllable range of the translation amount may be set in a range from 1 to 100 pixels.

In the step of c, all the data in the sub-region may be used for the calculation of the motion vector. In order to avoid a relatively large quantity of calculation and reduce a calculation error of the motion vector due to a certain smooth region, characteristic points (i.e. those points which have a relatively large value or any other distinct feature in an image) within the sub-region can also be used for the calculation of the motion vector. In the latter case, the purposes of the division into the sub-regions are for performing a quality filtering and for selecting characteristic points which may be scattered in different parts of the image. After a selection of some characteristic points in the sub-region $F_i$, the system then obtains a motion vector for these characteristic points with their corresponding points on the aligned image.

The size of a sub-region 26 in the step of b will influence the accuracy and the speed of a subsequent calculation, and will make the characteristic points too few and hence be adverse to the calculation if it is too large, or otherwise increase the calculation amount if it is too small. The size of the sub-region 26 in the present embodiment is 32*32. Since the influence of the noises in a ultrasonic image is relatively large, and is particularly significant in the image of an uniform part of the organism, a correction calculation of the motion vector is especially important for calculating a transform coefficient for the $F_i$ and the aligned image. In addition, since it may be relatively precise to find a corresponding point using a distinct point in an image region, a distinct point on the $F_i$ is selected as a characteristic point, and then the motion vector is calculated through obtaining a corresponding point corresponding to the characteristic point.

Figure 3:
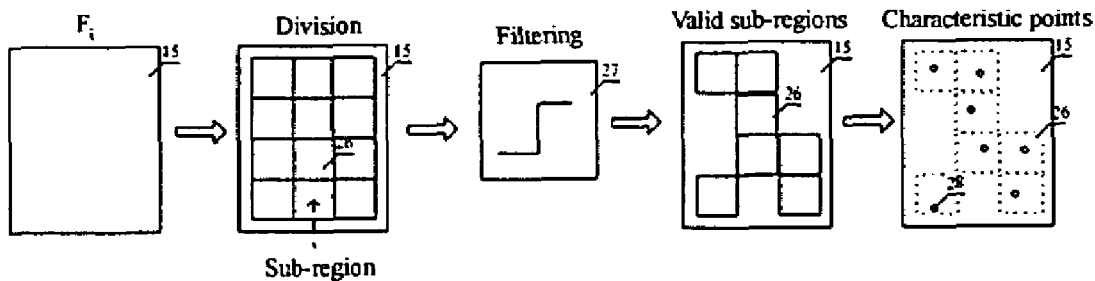
FIG. 3 is a schematic diagram showing the procedure for selecting a characteristic point according to the embodiment of the invention.

For a further improvement of the speed and the accuracy of the calculation, the selection of a characteristic point 28 may be as shown in the procedure of FIG. 3. After a division into sub-regions, valid sub-regions are selected through a filtering.

That is, the sub-regions that are within a region of the smooth organism or have a very low grayscale (these sub-regions not only effect the calculation of the offset and hence the precision of the transform coefficient, but also increase the amount of the processed data and hence low down the processing speed) on the image are filtered out. Various indexes such as an averaged grayscale, a calculated boundary gradient or the like may be utilized to perform filtering 27 and various methods of filtering may be included as long as they are directed to eliminate those image regions from which a precise motion vector is not easily obtained and to keep those image regions which have a distinct feature. Since they are well disclosed in the prior art, their descriptions will be omitted here so as to avoid repetition.

Figure 4:
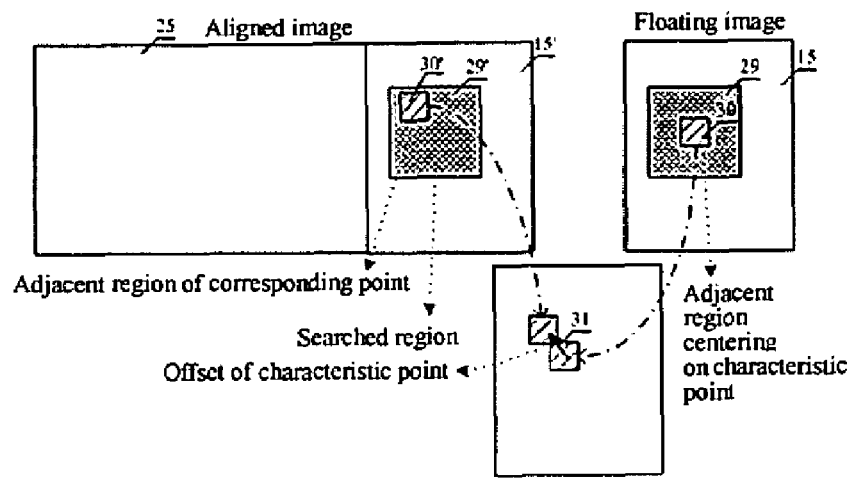
FIG. 4 is a schematic diagram showing the procedure for calculating the corresponding point according to the embodiment of the invention.

A characteristic point may be selected on the resultant valid region so as to determine a corresponding point. The calculation of the motion vector with the characteristic point in the step of c involves such a step of searching for a point corresponding to each of characteristic points 28. As shown in FIG. 4, a region 30 that includes a set of adjacent points centering on a characteristic point is first taken as a template on the floating image $F_i$; a searched region 29' is then determined on the current aligned image (or the spliced image in which the previous n-1 image frames are spliced together); the calculation of the similarity is performed with the template and an adjacent region 30', which moves through taking each pixel as a center and has a same size as the template, in the region 29'; and a central point of the adjacent region 30' with the largest similarity is determined as a corresponding point of the characteristic point. Subsequently, in the step of c, a motion vector (offx,offy) 31 of the characteristic point through a coordinate calculation for the point pair "a characteristic point and a corresponding point" can be obtained. The above method of calculating the similarity may be various and may involve the cross-correlation method of performing calculations based upon an inner product of vectors, the SAD method of calculating a difference between vectors, or the like. Since they are well disclosed in the prior art, their descriptions will be omitted here so as to avoid repetition.

Figure 5:
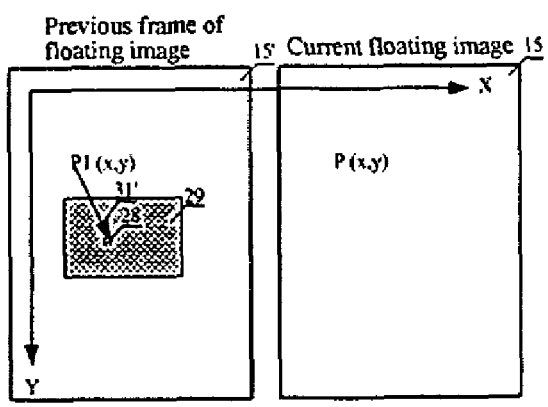
FIG. 5 is a schematic diagram showing the searched region according to the embodiment of the invention.
Figure 6:
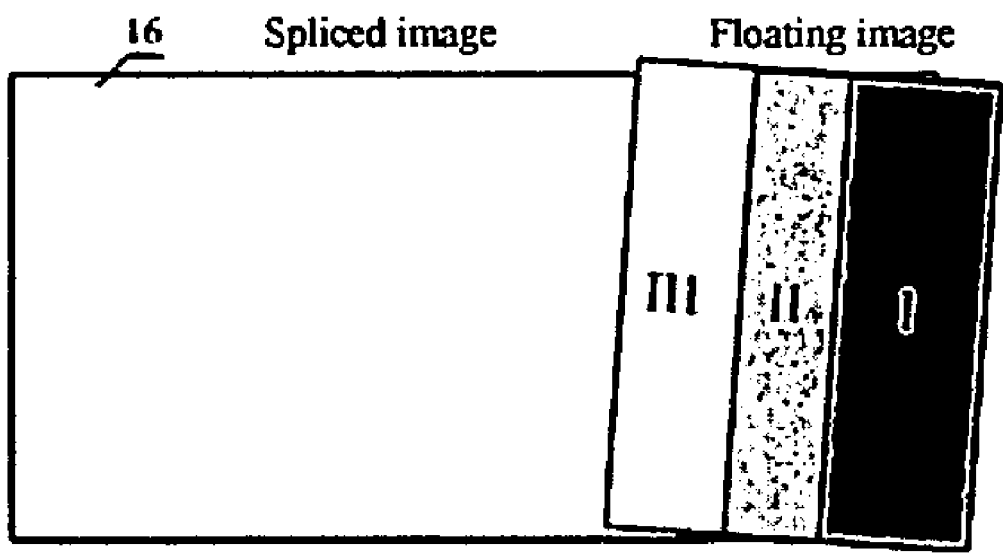
FIG. 6 is a schematic diagram showing the splicing procedure according to the embodiment of the invention.

During the determination of a corresponding point, the size of the searched region 29' has a great influence on the calculation speed, and will increase a possibility of correctly selecting a corresponding point but hence increase the calculation amount if it is too large, or otherwise reduce the possibility of correctly selecting a corresponding point if it is too small. In order to obtain a correct corresponding point and also control the calculation amount, it is necessary to determine a suitable searched region through a prediction. A method of prediction will be described with reference to FIG. 5.

For example, a searched region will be determined on the current aligned image for the searched image in the present embodiment. Since the splicing of the aligned image is to directly cover a corresponding position with the floating image $F_i$, the search procedure is thus actually a procedure of calculating the similarity between the $F_i$ and the previous floating image frame $F_{i-1}$. We suppose that the images on the right and on the left are the previous floating image frame 15' and the current floating image 15. During the splicing, the system can record the accurate position of the previous floating image. We suppose that a point P (x, y) on the current floating image is corresponding to a point P1 on the previous floating image, and an offset vector 31' of the previous floating image frame $F_{i-1}$ is (pre_offx,pre_offy), and then the searched region is defined as follows:

$$[x + \text{pre\_offx} + XLft,$$
$$x + \text{pre\_offx} + XRgt] * [y + \text{pre\_offy} - Dy, y + \text{pre\_offy} + Dy];$$

$$XLft = \begin{cases} -\mu & \text{if ScanDirection is ture} \\ -\nu & \text{if ScanDirection is false} \end{cases}$$

$$XRgt = \begin{cases} \nu & \text{if ScanDirection is true} \\ \mu & \text{if ScanDirection is false} \end{cases}$$

where, $Dy=\gamma$, Y is a constant, ScanDirection represents a general direction for splicing the images, true represents that performing splicing toward the positive direction of the X coordinate axis, and false represents that performing splicing toward the negative direction of the X coordinate axis. Depending on the scan direction, the system sets the number of the pixels searched in the direction same as the scan direction to be more than those searched in the opposite direction, i.e. $\mu < \nu$, each of which is a predicted value. Since the probe has a relatively small translation in the Y direction, $\gamma$ is accordingly relatively small.

The actual probe is liable to move in the Y direction. Consequently, at the time of calculating the corresponding point of the characteristic point, it is necessary to rotate the floating image by a certain angle prior to the determination of the template 30 for the characteristic point, so that the aligned image will be corresponded to more appropriately. Theoretically, the calculated corresponding point will be the most exact if the rotation angle equals exactly the desired one for the practice. Thus, the present embodiment also use the previous two spliced floating image frames to predict the rotation angle σ:

$$\sigma = \begin{cases} \alpha & \alpha - \beta < \varepsilon \\ \alpha + (\alpha - \beta) & \alpha - \beta \geq \varepsilon \end{cases}$$

Where, α is the rotation angle of the previous floating image, β is the rotation angle of the further previous floating image, and ε is a factor of error which is set experientially and used for the reduction of the calculation error.

In order to further reduce the calculation error of the motion vector with the SAD method in the step of c, executing a second filtering of our proposed double-filtering architecture may be employed. That is, the motion vector is filtered so as to further filter the: point pair including a characteristic point and a corresponding point thereof. It is mainly directed to eliminate some wrongly determined point pairs, i.e. a filtering with the nature of "pruning". In other words, an individual is deleted which deviates from a set of motion vectors. Also, there are many methods for achieving a filtering within a set, such as the method of clustering (i.e. cluster data so as to eliminate a point which is the farthest away from a center), the algorithm of fuzzy C-mean (see Reference 1). The filtering also can use various experiential indexes to judge the elimination of an ineligible motion vector.

The method for fitting the motion vector in the step of d includes the methods of MLS, SAD or the like.

In the above steps of c and d, there possibly occur the following cases of failing to obtain a valid transform coefficient.

Case 1: The quality of a single image frame is unreliable and no calculation is performed with the MLS. This case occurs in the double filtering during the alignment, including one filtering for selecting characteristic points and the other filtering of motion vectors. If the number of valid point pairs of the characteristic points and the corresponding points (motion vectors) is smaller than a preset number after the double filtering (possibly in that the correlation may be too poor due to a too large translation amount of the $F_i$ relative to its previous image or any other factor), then the image frame will not be subject to the final splicing.

Case 2: The offset of the transform coefficient calculated with the MLS appears abnormal (too fast or too slow). This case may be due to any problem of input data (the previous and the subsequent frames are incoherent) or due to an inaccuracy of the above interval preset through the prediction, wherein the calculated motion vector may be too large or small if the interval is too large or small.

As for any of the above cases, the image frame will not be subject to the subsequent splicing (i.e. the step of e), and a return procedure will be executed to go back to the initial state prior to the processing of the frame. Meanwhile, the interval for picking up the image sequence will be adjusted self-adaptively for executing the processing of another frame.

When there occurs the cases, including the case 1, continuously several times in which the subsequent splicing is not performed, the system can judge that the part of the image among the image sequence is undesirable in quality, thus terminate the calculation for the remaining frames, output the current spliced image as the resultant image, and display information of an interruption. The number of times can be set no more than 5.

In the step of E, the method of a weighted average of a partially overlapped region may be employed to splice the single image frame $F_i$ to the current spliced image, and it is required to consider whether the floating image shall be spliced from the left or the right of the spliced image. For example, the splicing is performed from the positive direction of the X axis (i.e. from the right of the spliced image) as shown in FIG. 7, and we suppose that the floating image has a width of wFlt and is divided into three parts I, II and III from the right to the left (i.e. along the direction of the splicing). For the part I, its width is wFlt·$\omega_1$, and the value of each pixel may be directly used to set a value (of grayscale) for a corresponding point on the spliced image. For the part II, it has a width of wFlt·$\omega_2$ and an abscissa range of [XBegin, XEnd] on the floating image. A weighted average of the value of each pixel and the value of grayscale for a corresponding point on the spliced image may be employed to assign the corresponding point. We suppose that the grayscale value of each pixel on the floating image is GFlt, and the original grayscale value of the corresponding point on the current spliced image is GScp, and then the grayscale value Gray of the corresponding point on the new spliced image is defined as follows:

Gray=$GFlt$*weight+$GScp$*(1−weight)

Where, weight is a value of weighting which can be determined through the following formula:

weight=0.8*(x−XBegin)/(XEnd−XBegin)+0.1

Where, x ∈[XBegin, XEnd], that is, the weight ranges and increases linearly from a minimum of 0.1 on the left boundary to a maximum of 0.9 on the right boundary.

For the part III which is a part overlapped with the current spliced image, it has a width of wFlt·$\omega_3$, the grayscale values of respective pixels on the spliced image that are corresponding to the part may be reserved.

For the above, $\omega_1+\omega_2+\omega_3=1$. The image transits continuously and becomes smooth at the spliced part after the above splicing. Specifically, $\omega_1$ shows a range within which the floating image is directly embedded in the new spliced image; $\omega_3$ shows a range within which the pixels of the new spliced image are originated directly from the original spliced image (the overlapped part of the floating image and the original spliced image); and $\omega_2$ shows the size of the transition region of the overlapped part of the floating image and the original spliced image. Therefore, $\omega_2$ shall not be too large, otherwise the resultant volume-panorama image will be subject to an excess weighted average, resulting in a loss of fuzzy details on the image. However, $\omega_2$ shall not be too small, otherwise there will be a discontinuous phenomenon where the floating image and the original spliced images cross each other on the new spliced image.

The method according to a second embodiment of the present invention comprises the steps of:
  a. obtaining an image sequence, and initializing a spliced image as a first image frame, where, i=2;
  b. search the i-th image frame $F_i$ for a characteristic point;
  c. calculating a valid motion vector of the i-th image frame, and jumping to step of F if the number of the motion vectors is not enough;
  d. calculating a transform coefficient based upon a fitting of the motion vectors;
  e. splicing the $F_i$ to the current spliced image based upon the transform coefficient; and
  f. i=i+1, and returning to the step of b if the i-th frame exists, otherwise outputting the current spliced image as a resultant image.

The step of b further comprises the steps of:
  b1. performing divisions for a middle part of the image $F_i$;
  b2. selecting valid sub-regions from the sub-regions of the image $F_i$ through a filtering; and
  b3. selecting a characteristic point in each valid sub-region.

The descriptions for how to calculate the valid motion vector and select the characteristic point are omitted here so as to avoiding repetition, since they have been described in the first embodiment.

What is claimed is:

1. A method of panoramic image processing, for generating an object image from an image sequence obtained in a real-time way or stored in a medium, in which a serial number i of an image is 1, 2, 3, . . . , and Δ is an interval for picking up the image sequence, comprising the steps of:
  a. obtaining the image sequence from an ultrasonic imaging apparatus comprising a probe for transmitting an ultrasonic wave to a detected organism and receiving an ultrasonic echo reflected from the detected organism, and initializing an aligned image and a spliced image as a first image frame;
  b. dividing an i-th image frame F; into a plurality of sub-regions, and selecting valid sub-regions from the sub-regions of the i-th image frame F; through a first filtering;
  c. calculating motion vectors for the valid sub-regions of the i-th image frame with respect to a current aligned image;
  d. adaptively adjusting the interval Δ within a value range of Δ based on a translation amount of the i-th image frame Fi being within a controllable range
  e. calculating a transform coefficient based upon a fitting of the motion vectors;
  f. splicing the i-th image frame F to a current spliced image based upon the transform coefficient, and configuring or splicing the current aligned image with the i-th image frame Fi; and
  g. displaying the current spliced image as a resultant image on a display device.

2. The method according to claim 1 wherein the controllable range of the translation amount is set in a range from 1 to 100 pixels.

3. The method according to claim 1, wherein the step of c involves performing the steps of:
   c1. selecting a plurality of characteristic points on the i-th image frame $F_i$;
   c2. searching the current aligned image for a corresponding point of each characteristic point; and
   c3. calculating the motion vector of each point pair constituted by the characteristic point and the corresponding point.

4. The method according to claim 3, wherein the step of b involves performing the steps of:
   1) determining a template on the i-th image frame $F_i$ for a selected one of the characteristic points which is a region that includes a set of adjacent points centering on the selected characteristic point;
   2) determining a searched region on the current aligned image; and
   3) determining a corresponding point of the selected characteristic point within the searched region through a similarity calculation, which is a central point of an adjacent region with a same size as the template and with the largest similarity.

5. The method according to claim 4, wherein the searched region in the step of 2) is defined through a prediction:

$$[x + pre\_offx + XLft, x + pre\_offx + XRgt] * [$$
$$y + pre\_offy - Dy, y + pre\_offy + Dy];$$
$$XLft = \begin{cases} -\mu & \text{if ScanDirection is true} \\ -v & \text{if ScanDirection is false} \end{cases}$$
$$XRgt = \begin{cases} v & \text{if ScanDirection is true} \\ \mu & \text{if ScanDirection is false} \end{cases}$$

where, (x, y) are coordinates of the selected characteristic point, (pre_offx, pre_offy) is an offset vector of the previous image frame, ScanDirection represents a general direction for splicing the images, true represents that the splicing is performed toward the positive direction of the X coordinate axis, and false represents that the splicing is performed toward the negative direction of the X coordinate axis; $Dy = \gamma$, $\gamma$ is a constant, and $\mu < v$, each of which is a predictive value.

6. The method according to claim 4, wherein the i-th image frame $F_i$, which is floating with respect to the current aligned image, is rotated, before the step of 1), by an angle which is defined through a prediction:

$$\sigma = \begin{cases} \alpha & \alpha - \beta < \varepsilon \\ \alpha + (\alpha - \beta) & \alpha - \beta \geq \varepsilon \end{cases}$$

where, $\alpha$ is the rotation angle of the previous floating image, $\beta$ is the rotation angle of the further previous floating image, and $\varepsilon$ is a factor of error.

7. The method according to claim 3, further comprising a step of:
   c4. filtering the motion vectors to select valid motion vectors.

8. The method according to claim 1, wherein:
if an offset of the calculated transform coefficient is abnormal, or a number of valid motion vectors selected through a second filtering is less than a preset number, a current image frame is not subject to a subsequent step of the splicing;

the processing of the current image frame is returned to an initial status and the interval $\Delta$ for picking up the image sequence is adjusted based on the processing of another frame; and when there occurs a case continuously several times in which the current image frame is not subject to the subsequent splicing, the current spliced image is outputted as the resultant image and an information of interruption is displayed on the display device.

9. The method according to claim 7, wherein:
if an offset of the calculated transform coefficient is abnormal, or a number of the valid motion vectors selected through the filtering is less than a preset number, a current image frame is not subject to a subsequent step of the splicing;

the processing of the current image frame is returned to an initial status and the interval $\Delta$ for picking up the image sequence is adjusted based on the processing of another frame; and when there occurs a case continuously several times in which the current image frame is not subject to the subsequent splicing, the current spliced image is outputted as the resultant image and an information of interruption is displayed on the display device.

10. The method according to claim 1, wherein in the step of e:
the single i-th image frame $F_i$ is spliced to the current spliced image with a method of a weighted average of the partially overlapped region; and for the splicing of the current aligned image, the single i-th image frame $F_i$ is directly embedded in the current aligned image based upon the transform coefficient.

11. The method according to claim 10, wherein the method of the weighted average of the partially overlapped region comprises the steps of:
   i. dividing the i-th image frame $F_i$ with a width of wFlt into three parts respectively with a width of wFlt·$\omega_1$, wFlt·$\omega_2$ and wFlt·$\omega_3$ along the direction of the splicing, where, $\omega_1+\omega_2+\omega_3=1$; and
   ii. for the first part, directly using the value of each pixel to set a value for a corresponding point on a new spliced image; for the third part, reserving the values of respective pixels on the new spliced image that are corresponding to the part; and for the second part, a value Gray of the corresponding point on the new spliced image being defined as:

Gray=$GFlt$*weight+$GScp$*(1−weight)

where, GFlt is the value of each pixel on the i-th image frame $F_i$, GScp is the original value of the corresponding point on the current spliced image, and weight is a value of weighting.

12. The method according to claim 11, wherein:
the value of weighting weight ranges from 0.1 to 0.9 and is defined as:

weight=0.8*(x−XBegin)/(XEnd−XBegin)+0.1 where x∈[XBegin, XEnd], and [XBegin, XEnd] is an abscissa range of the second part of the $F_i$.

13. A method of panoramic image processing, for generating an object image from an image sequence obtained in a real-time way or stored in a medium, in which the serial number i of an image is 1, 2, 3, ..., comprising the steps of:

a. obtaining the image sequence from an ultrasonic imaging apparatus comprising a probe for transmitting an ultrasonic wave to a detected organism and receiving an ultrasonic echo reflected from the detected organism, and initializing a spliced image as a first image frame;
b. searching an i-th image frame $F_i$ for characteristic points by performing divisions for a middle part of the i-th image frame $F_i$, selecting valid sub-regions from sub-regions of the i-th image frame $F_i$ through a first filtering; and selecting a characteristic point in each valid sub-region;
c. calculating motion vectors for the valid sub-regions of the i-th image frame $F_i$, selecting valid motion vectors from the motion vectors through a second filtering, and jumping to step of f if the number of the valid motion vectors is smaller than a preset number;
d. calculating a transform coefficient based upon a fitting of the valid motion vectors;
e. splicing the i-th image frame $F_i$ to a current spliced image based upon the transform coefficient; and
f. displaying the current spliced image as a resultant image on a display device.

14. The method according to claim 1, wherein, for the first image frame, i=2 and Δ=1.

15. The method according to claim 13, wherein, for the first image frame, i=2.

16. A panoramic imaging system comprising:
an ultrasonic imaging apparatus comprising:
a probe to transmit ultrasonic waves to a detected organism and receive ultrasonic echoes reflected from the detected organism;
a beam combiner coupled to the probe to receive the ultrasonic echoes;
a detector coupled to the beam combiner to provide focus delay, weighting, and channel summing to formed ultrasonic beams; and
a digital signal transformer to receive a signal from the detector, the digital signal transformer to perform a coordinate transform on the signal to produce an ultrasonic image sequence, in which a serial number i of an image is 1, 2, 3, . . . , and A is an interval for picking up the image sequence;
a processor to combine the image sequence into a panoramic image, the processor configured to:
initialize an aligned image and a spliced image as a first image frame;
divide an i-th image frame F; into a plurality of sub-regions, and select valid sub-regions from sub-regions of the i-th image Fi; through a first filtering
calculate motion vectors for the valid sub-regions of the i-th image frame Fi; with respect to a current aligned image;
adaptively adjust the interval Δ within a value range of Δ based on a translation amount of the i-th image frame Fi being within a controllable range
calculate a transform coefficient based upon a fitting of the motion vectors; splice the i-th image frame F; to a current spliced image based upon the transform coefficient, and configure or splice the current aligned image with the i-th image frame Fi; and
output the current spliced image as a resultant image; and
a display device to display the resultant image.

17. The system according to claim 16, wherein the processor is further configured to:
adaptively adjusting the interval Δ within a value range of Δ based on a translation amount being within a controllable range.

18. The system according to claim 17, wherein the controllable range of the translation amount is set in a range from 1 to 100 pixels.

19. The system according to claim 16 wherein the processor is further configured to:
adaptively adjusting the interval Δ which a value range of Δ based on a translation amount being within a controllable range.

20. The system according to claim 19, wherein the processor is further configured to:
determine a template on the i-th image frame $F_i$ for a selected one of the characteristic points, which is a region that includes a set of adjacent points centering on the selected characteristic point;
determine a searched region on the current aligned image; and
determine a corresponding point of the selected characteristic point within the searched region through a similarity calculation, which is a central point of an adjacent region with a same size as the template and with the largest similarity.

21. The system according to claim 20, wherein the processor is further configured to define the searched region through a prediction:

$$[x + \text{pre\_offx} + XLft, x + \text{pre\_offx} + XRgt] *$$
$$[y + \text{pre\_offy} - Dy, y + \text{pre\_offy} + Dy];$$

$$XLft = \begin{cases} -\mu & \text{if ScanDirection is ture} \\ -v & \text{if ScanDirection is false} \end{cases}$$

$$XRgt = \begin{cases} v & \text{if ScanDirection is true} \\ \mu & \text{if ScanDirection is false} \end{cases}$$

where, (x, y) are coordinates of the selected characteristic point, (pre_offx, pre_offy) is an offset vector of the previous image frame, ScanDirection represents a general direction for splicing the images, true represents that the splicing is performed toward the positive direction of the X coordinate axis, and false represents that the splicing is performed toward the negative direction of the X coordinate axis; Dy=γ, γ is a constant, and μ<v, each of which is a predictive value.

22. The system according to claim 20, wherein the processor is further configured to rotate the i-th image frame $F_i$, which is floating with respect to the current aligned image by an angle which is defined through a prediction:

$$\sigma = \begin{cases} \alpha & \alpha - \beta < \varepsilon \\ \alpha + (\alpha - \beta) & \alpha - \beta \geq \varepsilon \end{cases}$$

where, α is the rotation angle of the previous floating image, β is the rotation angle of the further previous floating image, and ε is a factor of error.

23. The system according to claim 19, wherein the processor is further configured to:
filter the motion vectors to select valid motion vectors.

24. The system according to claim 16, wherein the processor is further configured to:
if an offset of the calculated transform coefficient is abnormal, or a number of valid motion vectors selected through a second filtering is less than a preset number, not subject a current image frame to a subsequent splicing;

return the processing of the current image frame to an initial status and adjust the interval Δ for picking up the image sequence based on the processing of another frame; and when there occurs a case continuously several times in which the current image frame is not subject to the subsequent splicing, output the current spliced image as the resultant image.

25. The system according to claim 23, wherein the processor is further configured to:

if an offset of the calculated transform coefficient is abnormal, or a number of the valid motion vectors selected through the filtering is less than a preset number, not subject a current image frame to a subsequent splicing;

return the processing of the current image frame to an initial status and adjust the interval Δ for picking up the image sequence based on the processing of another frame; and when there occurs a case continuously several times in which the current image frame is not subject to the subsequent splicing, output the current spliced image as the resultant image.

26. The system according to claim 16, wherein when the processor performs splicing, the processor is configured to:

splice the single i-th image frame $F_i$ to the current spliced image with a method of a weighted average of the partially overlapped region; and splice the current aligned image by directly embedding the single i-th image frame $F_i$ in the current aligned image based upon the transform coefficient.

27. The system according to claim 26, wherein the processor performs the method of the weighted average of the partially overlapped region by:

dividing the i-th image frame $F_i$ with a width of wFlt into three parts respectively with a width of $wFlt \cdot \omega_1$, $wFlt \cdot \omega_2$ and $wFlt \cdot \omega_3$ along the direction of the splicing, where, $\omega_1 + \omega_2 + \omega_3 = 1$; and for the first part, directly using the value of each pixel to set a value for a corresponding point on a new spliced image; for the third part, reserving the values of respective pixels on the new spliced image that are corresponding to the part; and for the second part, a value Gray of the corresponding point on the new spliced image being defined as:

$$Gray = GFlt * weight + GScp * (1-weight)$$

where, GFlt is the value of each pixel on the i-th image frame $F_i$, GScp is the original value of the corresponding point on the current spliced image, and weight is a value of weighting.

28. The system according to claim 27, wherein:

the value of weighting weight ranges from 0.1 to 0.9 and is defined as:

$$weight = 0.8 * (x - XBegin)/(XEnd - XBegin) + 0.1$$

where $x \in [XBegin, XEnd]$, and $[XBegin, XEnd]$ is an abscissa range of the second part of the $F_i$.

* * * * *